United States Patent [19]

Schmid

[11] 4,116,111
[45] Sep. 26, 1978

[54] MILLING APPARATUS

[75] Inventor: Karlheinz Schmid, Neckartenzlingen, Germany

[73] Assignee: Gebrueder Heller Maschinenfabrik GmbH, Nuertingen, Germany

[21] Appl. No.: 760,253

[22] Filed: Jan. 18, 1977

[30] Foreign Application Priority Data

Apr. 24, 1976 [DE] Fed. Rep. of Germany ....... 2618093

[51] Int. Cl.² .......................... B23C 3/06; B24B 5/40; B23B 5/18
[52] U.S. Cl. ............................. 90/15 R; 51/105 SP; 82/9
[58] Field of Search .................. 51/105 SP, 165.91; 82/9; 90/15 R, 20; 29/6

[56] References Cited

U.S. PATENT DOCUMENTS

| 3,690,072 | 9/1972 | Price | 51/165.91 |
| 3,757,615 | 9/1973 | Oeming | 82/9 |
| 3,795,161 | 3/1974 | Berbalk | 82/9 |

Primary Examiner—Othell M. Simpson
Attorney, Agent, or Firm—W. G. Fasse; W. W. Roberts

[57] ABSTRACT

The present milling apparatus is constructed especially for milling crankshafts. A milling unit carrying milling cutters is adjustable on guide rails back and forth toward a workpiece such as a crankshaft. The crankshaft is held in respective chucks also supported on the machine base. Continuously adjustable bracing devices interconnect the milling unit with the workpiece supporting chucks on a side opposite the machine base, whereby undesired vibrations are avoided and the tool life is substantially increased.

5 Claims, 2 Drawing Figures

MILLING APPARATUS

BACKGROUND OF THE INVENTION

The present invention relates to a milling apparatus, especially a milling machine for crankshafts. Such machines have a base on which two chucks or vises are supported to hold the two ends of the workpiece such as a crankshaft. A milling unit carrying a plurality of milling cutters is movable back and forth on guide means on the machine bed or base toward or away from the workpiece.

Machines of the just described type operate in such a manner that after a crankshaft has been placed into the respective mounting chucks, the milling unit is advanced toward the crankshaft in a so-called immersion movement until the disk milling cutters reach the diameter of the bearing surface of the crankshaft. At this point the milling unit is stopped and the crankshaft is rotated with its chucks. Thus, the milling of the bearing surfaces of the crankshaft is completed when the crankshaft has made one full revolution.

Conventional crankshaft milling machines of the just described type have mainly three drawbacks. First, the milling accuracy of the workpiece is small. Second, the milled surface of the workpiece shows chatter marks. Third, the operational life span of the disk milling cutters is too short.

The just mentioned disadvantages of conventional crankshaft milling machines of the described type are the result of unsatisfactory dynamic characteristics of these machines. Such undesirable dynamic characteristics are inherent in the machine itself because the crankshaft, which as such is relatively flexible, is generally supported in a sufficient manner by special supporting devices.

It is also known to provide machines of the just described type with stop means which limit the feed advance movement of the milling unit and thus the immersion depth of the milling cutters, whereby these stops determine the diameter of the bearing portions of the crankshaft. Such stops have been heretofore arranged close to the machine bed or base, whereby the resulting dimensional precision of the final bearing surface diameters was limited in prior art machines of this type and it was hard to adjust the stops.

OBJECTS OF THE INVENTION

In view of the above it is the aim of the invention to achieve the following objects, singly or in combination:
- to improve the dynamic operational characteristics of crankshaft milling machines of the type described above;
- to provide means which will compensate for the diameter reduction of the machine bed or base which reduction results from the arrangement of a channel below the workpiece to receive the cuttings or shavings resulting from the milling operation;
- to stiffen the machine base in such a manner that it is capable to take up the forces occurring during the milling operation, without any noticeable elastic deformation;
- to improve the structure of such milling machines so that a smooth operation is assured; and
- to arrange the stop which determines the final, machined dimension of the work piece in such a manner, that a precision machining is accomplished and that the stops are simultaneously easily accessible for adjustment.

SUMMARY OF THE INVENTION

According to the invention there is provided a milling apparatus, especially for crankshafts, wherein continuously adjustable bracing elements interconnect the milling unit proper with the chucking devices for the crankshaft on a side opposite to the machine base. Such continuously adjustable bracing elements provide, in cooperation with the machine bed, a closed force transmission flow around the milling point, that is, around the workpiece. Thus, the machine base, the diameter of which is reduced by the above mentioned shavings channel, is not required to take up bending moments, but merely tensional forces. Even the reduced diameter of the machine bed is capable to take up such tensional forces without any noticeable elastical deformations.

It is an advantage of the features of the invention that a smooth machine operation is achieved which greatly improves the operational life of the disk milling cutters and which also assures a good machining precision as well as an improved roundness of the milled bearing surfaces of the crankshaft.

According to the invention there is further provided stop means arranged in the immediate proximity of the continuously adjustable bracing elements. In other words, the stop means are arranged also on a side of the milling unit and chucking devices facing away from the machine base or bed. This feature has the advantage that it improves the machining precision and simultaneously the stop means are more easily accessible for adjustment as compared to similar stop means in prior art milling machines.

BRIEF FIGURE DESCRIPTION

In order that the invention may be clearly understood, it will now be described, by way of example, with reference to the accompanying drawings, wherein:

FIG. 1 is a simplified top plan view of a crankshaft milling apparatus according to the invention; and FIG. 2 is a side view of the apparatus shown in FIG. 1.

DETAILED DESCRIPTION OF PREFERRED EXAMPLE EMBODIMENTS

Figure 1:
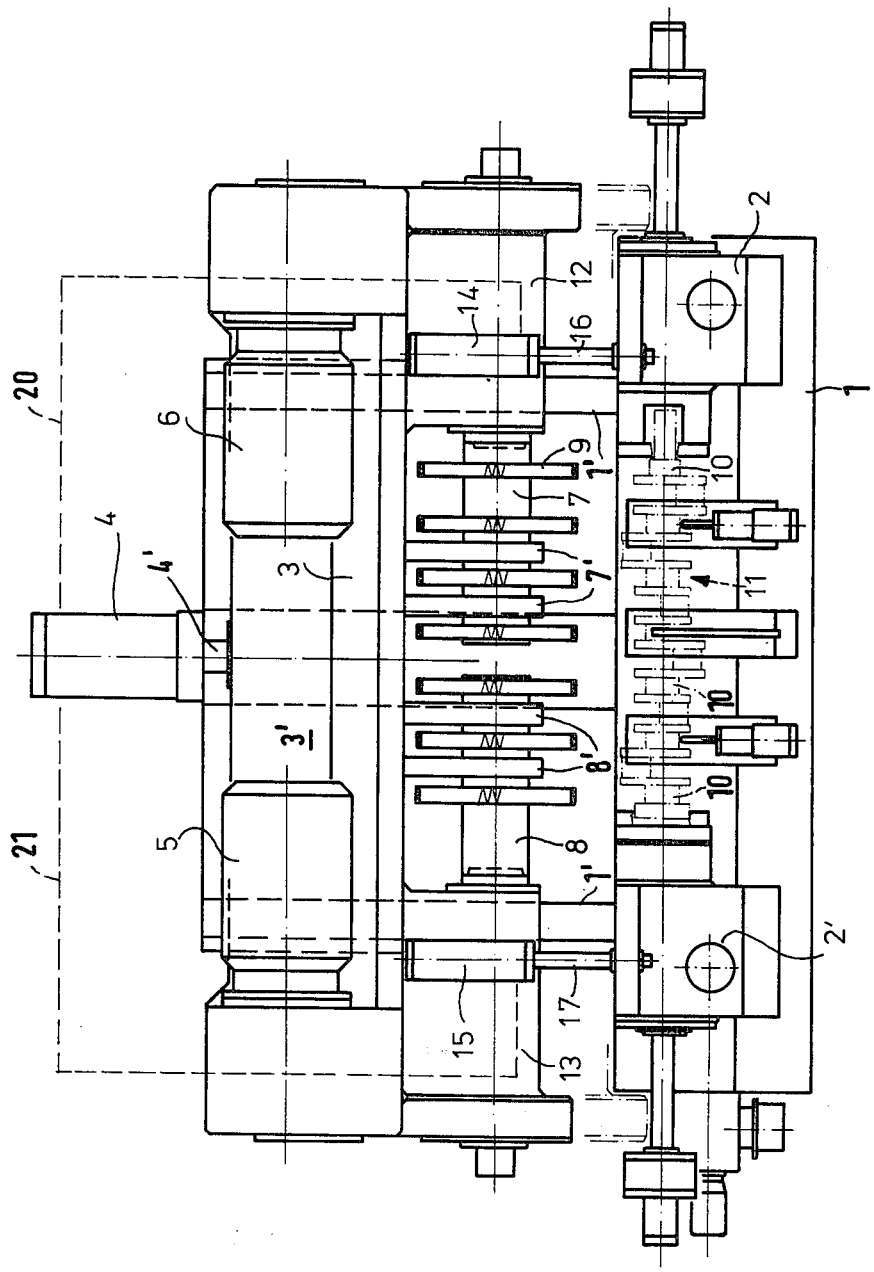

The crankshaft milling apparatus illustrated in the drawings comprises a machine bed or base 1 carrying guide rails 1' which in turn support a milling unit 3 carrying two mounting devices 12 and 13 for respective milling cutter arbors 7 and 8. These arbors 7 and 8 are further supported by bearing means 7' and 8' respectively. The arbors 7 and 8 are driven by respective motors 6 and 5 through conventional gear means. These feed advance drive means 5 and 6 also form part of the milling unit 3 which is slidable back and forth on the guide rails 1' by means of a feed advance mechanism 4 including a piston cylinder arrangement driven from a source of power, for example, a hydraulic pressure source not shown. The piston rod 4' is operatively connected to a cross bar 3' and the cylinder is secured to the machine base 1. Thus, the entire milling unit 3, including the milling cutters 9 carried by the respective arbors 7, 8, is shiftable back and forth on the guide rails 1'.

Each arbor 7, 8 carries a plurality of milling or cutting disks 9. The number of the cutting disks 9 will depend on the number of bearing surfaces 10 of the particular type of crankshaft 11 shown in dashed lines in FIG. 1. The crankshaft 11 is supported by two chucking heads or mountings 2, 2' mounted on the machine frame 1. The crankshaft 11 may be rotated in the chucking heads by conventional drive means schematically shown in FIG. 1.

According to the invention the milling unit 3 and the chucks 2, 2' are interconnected by continuously adjustable bracing means on a side opposite of the machine base 1. For this purpose there are provided, for example, piston cylinder means 14, 15, 16, and 17. Thus, the cylinder 15 is rigidly secured to the arbor mounting 13 and the piston rod 17 is rigidly secured to the workpiece chuck 2'. Similarly, the cylinder 14 is rigidly secured to the arbor mounting 12 and the piston rod 16 is rigidly secured to the workpiece chuck 2. A dashed line 20 interconnects the cylinder 14 and the cylinder of the feed advance device 4 to indicate that both cylinders are connected to the same source of pressure, for example, a hydraulic pump. Similarly, dashed line 21 interconnecting cylinder 15 and the cylinder of the feed advance device 4 also signifies the same feature, namely, that both cylinders 14 and 15 of the continuously adjustable bracing means are driven in synchronism with the feed advance of the milling unit 3. Although hydraulic adjusting means 14 to 17 are shown, it will be appreciated that other adjusting means may be employed, for example, a feed screw or the like.

Figure 2:
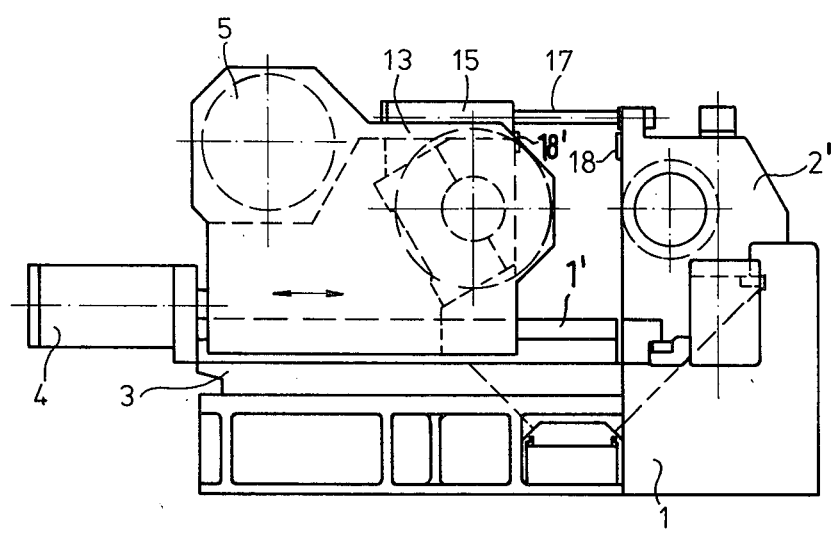

Referring to FIG. 2 there is shown a stop member 18 secured to the chucking head 2'. A similar stop member will be secured to the chucking head 2. These stop members 18 may be of conventional, adjustable structure. However, according to the invention, the stop members are located immediately adjacent to the piston rods 16 and 17, thereby achieving the above mentioned advantages of an improved accessibility as well as of an improved precision in the milling operation. The stop members 18 cooperate with respective stop members 18' secured to the mounting members 13 and 12.

The present apparatus operates as follows. A crankshaft 11 to be milled is mounted in the chucking heads 2, 2' as shown in FIG. 1. The drive means 6 for the arbors 8 and 7 respectively are started and thereafter the feed advance 4 is also energized. Since the hydraulic cylinders 14 and 15 are connected to the same source of power as the cylinder of the feed advance unit 4, the cylinders 14 and 15 are supplied with hydraulic fluid in the same manner as the feed advance unit 4, whereby the piston rods 16 and 17 move in synchronism with the feed advance of the milling unit 3. Thus, the piston rods 16 and 17 are pulled into their respective cylinders 14 and 15 in synchronism with the feed advance of the unit 3.

When the milling disks 9 contact the bearing surface 10 of the crankshaft 11, the piston rods 16 and 17 prevent the mounting heads 12 and 13 from yielding backwardly in response to the work pressure resulting from the feed advance of the unit 3. Simultaneously a yielding of the chucking heads 2, 2' is also prevented so that vibrations are substantially eliminated due to the substantially rigid bracing of the mounting heads 12, 13 and the chucking heads 2, 2' relative to each other. It has been found that vibrations are eliminated to such an extent that the machining precision and the roundness of the milled bearing surfaces 10 has been improved so much that the preliminary grinding necessary heretofore has become unnecessary. Thus, on a machine, according to the invention, the preliminary grinding and the finish grinding may be performed in one machining operation. Further, the operational life of the milling cutters 9 has been substantially increased.

Although the invention has been described with reference to specific example embodiments, it will be appreciated, that it is intended to cover all modifications and equivalents within the scope of the appended claims.

What is claimed is:

1. A milling apparatus, especially for crankshafts, comprising base means, guide means carried by said base means, a milling unit slidably supported on said guide means, drive means operatively connected to said milling unit for advancing said milling unit back and forth along said guide means, said milling unit including milling cutter arbor means, said apparatus further comprising workpiece chucking means operatively supported on said base means for cooperation with said milling unit, and continuously adjustable bracing means adjustably interconnecting said workpiece chucking means and said milling unit on a side opposite said base means, whereby the instantaneous horizontal spacing between said workpiece chucking means and said milling unit may be maintained substantially rigidly regardless of horizontally effective milling force components.

2. The apparatus of claim 1, wherein said bracing means comprise feed advance means.

3. The apparatus of claim 2, wherein said feed advance means comprise piston cylinder means.

4. The apparatus of claim 2, further comprising means operatively connecting said continuously adjustable bracing means to said drive means for adjusting the bracing means in synchronism with said drive means.

5. The apparatus according to claim 1, further comprising stop means for limiting the feed advance of said milling unit toward said workpiece, said stop means being arranged directly adjacent to said continuously adjustable bracing means.

* * * * *